United States Patent
Chen et al.

(10) Patent No.: US 10,991,298 B2
(45) Date of Patent: Apr. 27, 2021

(54) DISTANCE SENSOR, DISPLAY DEVICE, ELECTRONIC DEVICE AND DISTANCE DETECTION METHOD

(71) Applicant: BEIJING XIAOMI MOBILE SOFTWARE CO., LTD., Beijing (CN)

(72) Inventors: Chaoxi Chen, Beijing (CN); Fei Xie, Beijing (CN); Yanteng Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/695,144

(22) Filed: Nov. 25, 2019

(65) Prior Publication Data
US 2021/0056897 A1  Feb. 25, 2021

(30) Foreign Application Priority Data
Aug. 19, 2019 (CN) .......................... 201910764104.2

(51) Int. Cl.
  *H05B 47/105* (2020.01)
  *G09G 3/3208* (2016.01)
  (Continued)

(52) U.S. Cl.
  CPC ......... *G09G 3/3208* (2013.01); *H05B 47/105* (2020.01); *H05B 47/115* (2020.01);
  (Continued)

(58) Field of Classification Search
  CPC . G06F 2203/04101; G06F 2203/04108; G06F 2203/041; G06F 2203/00;
  (Continued)

(56) References Cited

U.S. PATENT DOCUMENTS

| | | | |
|---|---|---|---|
| 2011/0157697 A1* | 6/2011 | Bennett | H04N 13/00 359/462 |
| 2014/0191110 A1* | 7/2014 | Holenarsipur | G06F 3/03 250/206 |

(Continued)

FOREIGN PATENT DOCUMENTS

| | | |
|---|---|---|
| CN | 204989469 U | 1/2016 |
| CN | 108877654 A | 11/2018 |
| CN | 209056218 U | 7/2019 |

OTHER PUBLICATIONS

Supplementary European Search Report in the European application No. 19212650.6, dated May 27, 2020.

*Primary Examiner* — Julie Anne Watko
(74) *Attorney, Agent, or Firm* — Syncoda LLC; Feng Ma

(57) ABSTRACT

A distance sensor includes: a shell; and at least two infrared light emission devices, a light sensor and a light wall structure, which are arranged within a space enclosed by the shell. Each of the at least two infrared light emission devices emits light to a set range, and the set ranges corresponding to respective infrared light emission devices have an overlapping region beyond a preset height, a luminous flux density in the overlapping region exceeds a set density threshold value, and a luminous flux density outside the overlapping region is less than the set density threshold value. The light sensor is arranged in a preformed groove of the light wall structure. The light wall structure can be made from a light absorption material and configured to prevent incidence of light around to the light sensor.

18 Claims, 7 Drawing Sheets

(51) Int. Cl.
*G09G 3/22* (2006.01)
*G06F 1/16* (2006.01)
*H05B 47/115* (2020.01)
*G09G 3/3225* (2016.01)

(52) U.S. Cl.
CPC .. *G06F 1/1613* (2013.01); *G06F 2203/04101* (2013.01); *G06F 2203/04108* (2013.01); *G09G 3/22* (2013.01); *G09G 3/3225* (2013.01); *G09G 2360/14* (2013.01)

(58) Field of Classification Search
CPC .... G06F 1/1643; G06F 1/1635; G06F 1/1633; G06F 1/1613; G06F 1/16; G06F 1/00; G09G 3/3225; G09G 3/3208; G09G 3/32; G09G 3/30; G09G 3/22; G09G 3/20; G09G 3/00; G09G 2360/14; G09G 2360/00; G09G 2360/12; H05B 47/105; H05B 47/115; H05B 47/13; H05B 47/10; H05B 47/00
See application file for complete search history.

(56) References Cited

U.S. PATENT DOCUMENTS

| | | |
|---|---|---|
| 2015/0090909 A1* | 4/2015 | Shih ............... G06F 3/0421 250/578.1 |
| 2018/0164408 A1 | 6/2018 | Hall et al. |
| 2019/0205593 A1* | 7/2019 | Kim ............... G06F 1/1643 |
| 2019/0311666 A1* | 10/2019 | Chen ............... G01S 17/08 |
| 2020/0045527 A1* | 2/2020 | Fong ............... G06F 1/1694 |

* cited by examiner

DISTANCE SENSOR, DISPLAY DEVICE, ELECTRONIC DEVICE AND DISTANCE DETECTION METHOD

CROSS-REFERENCE TO RELATED APPLICATION

This application claims priority to Chinese patent application No. 201910764104.2 filed on Aug. 19, 2019, the disclosure of which is hereby incorporated by reference in its entirety.

BACKGROUND

At present, along with development of full-screen technologies, many functional units (for example, a distance sensor, a camera and the like) on an electronic device have been moved to be below a display screen, so as to ensure an effective display area of the display screen to be big enough. For example, for the distance sensor, an infrared light emission device in the distance sensor emits light with a wavelength of 940 nm, which may excite pixels on the display screen to emit light. In other words, the infrared light emission device may excite the display screen to display light spots, which may damage the display screen and influence viewing by a user.

SUMMARY

The present disclosure generally relates to the technical field of control, and more specifically to a distance sensor, a display device, an electronic device and a distance detection method.

The present disclosure provides a distance sensor, a display device, an electronic device and a distance detection method, to overcome the shortcomings of a related art.

According to a first aspect of embodiments of the present disclosure, there is provided a distance sensor portion, which may include: a shell; and at least two infrared light emission devices, a light sensor and a light wall structure, which are arranged within a space enclosed by the shell, each of the at least two infrared light emission devices may emit light to a set range, and the set ranges corresponding to respective infrared light emission devices may have an overlapping region beyond a preset height, a luminous flux density in the overlapping region may exceed a set density threshold value, and a luminous flux density outside the overlapping region may be less than the set density threshold value; the light sensor may be arranged in a preformed groove in the light wall structure; and the light wall structure may be made from a light absorption material and configured to prevent incidence of the light emitted by the at least two infrared light emission devices or ambient light to the light sensor.

According to a second aspect of the embodiments of the present disclosure, there is provided a display device, which may include an Organic Light-Emitting Diode (OLED) display screen and the distance sensor of the first aspect, wherein the distance sensor may be arranged on a substrate of the OLED display screen and on a side far away from a light output direction of the OLED display screen.

According to a third aspect of the embodiments of the present disclosure, there is provided a distance detection method, which may include: a synchronization signal sent by a driving circuit of a display screen is acquired; and a distance sensor is controlled for distance detection.

According to a fourth aspect of the embodiments of the present disclosure, there is provided an electronic device, which may include the display device of the second aspect.

According to a fifth aspect of the embodiments of the present disclosure, there is provided a readable storage medium having stored thereon computer-executable instructions that, when executed by a processor, implement the operations of the method of the third aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
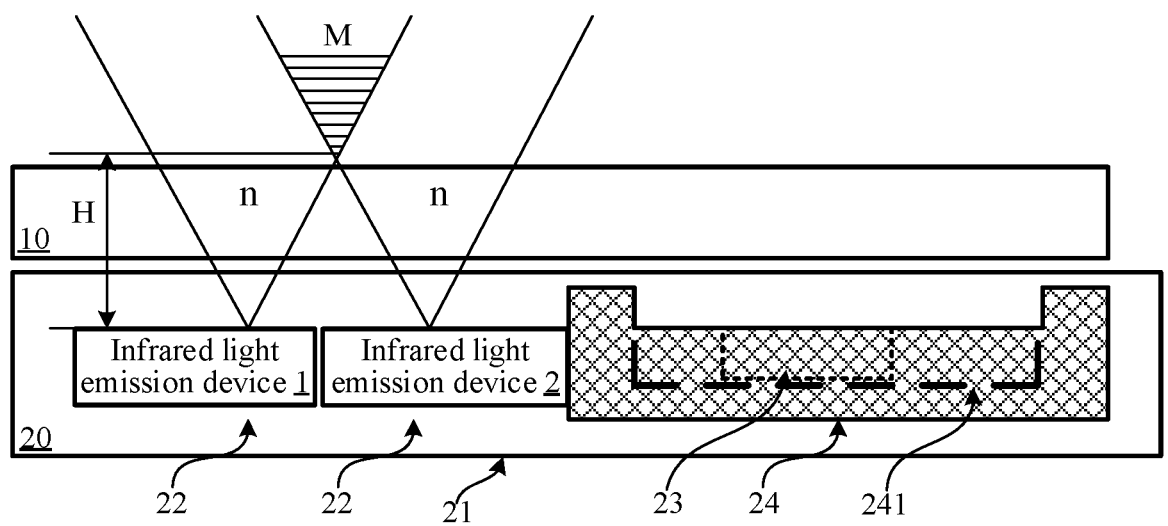
FIG. 1 is a block diagram of a distance sensor according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

At present, along with development of full-screen technologies, many functional units (for example, a distance sensor, a camera and the like) on an electronic device have been moved to be below a display screen, so as to ensure an effective display area of the display screen to be big enough. For example, for the distance sensor, an infrared light emission device in the distance sensor emits light with a wavelength of 940 nm, which may excite pixels on the display screen to emit light. In other words, the infrared light emission device may excite the display screen to display light spots, which may damage the display screen and influence viewing by a user.

Considering that a light spot appears because a photon is absorbed and then released, for solving the problem, the embodiments of the present disclosure provide a distance sensor or distance sensors or a distance sensor assemble capable of reducing a luminous flux density of a region where a display screen is located. The inventive concept lies in: at least two infrared light emission devices are arranged, each infrared light emission device emits light to a set range and a luminous flux density in the set range is less than a set density threshold value, so that each infrared light emission device is prevented from exciting the display screen to display a light spot. The set ranges of the at least two infrared light emission devices have an overlapping region of which a luminous flux density exceeds the set density threshold value beyond a preset height, thereby it is possible to meet a practical distance detection requirement of a light sensor in the distance sensor.

FIG. 1 is a structure diagram of a distance sensor according to some embodiments of the present disclosure. The distance sensor may be adapted to an electronic device requiring arrangement of a distance sensor. For example, for a smart phone, when a user is required to communicate by use of the smart phone, the distance sensor may detect a distance between a display screen and the user, and control the display screen to be turned off according to the distance that is actually detected. Referring to FIG. 1, the distance sensor 20 includes: a shell 21; and at least two infrared light emission devices 22, a light sensor 23 and a light wall structure 24, which are arranged within a space enclosed by the shell.

Each infrared light emission device 22 in the at least two infrared light emission devices 22 emits light to a set range n, the set ranges n corresponding to respective infrared light emission devices 22 have an overlapping region M beyond a preset height H, a luminous flux density in the overlapping region M exceeds a set density threshold value, and a luminous flux density outside the overlapping region M is less than the set density threshold value. The set density threshold value is a critical value corresponding to a luminous flux density of the light emitted by the infrared light emission device that may excite a pixel to emit light. The infrared light emission device may include at least one of a Light-Emitting Diode (LED) lamp, a Laser Diode (LD) lamp or a Vertical-Cavity Surface Emitting Laser (VCSEL). For ease of description, the solutions are described in each embodiment of the present disclosure with the condition that the infrared light emission device is in the form of an LED lamp as an example.

The light sensor 23 is arranged in a preformed groove 241 in the light wall structure 24.

The light wall structure 24 is made from a light absorption material and configured to prevent incidence of the light emitted by the at least two infrared light emission devices 22 or ambient light to the light sensor 23.

It is to be noted that a measurement starting point of the preset height H may be positioned on an emission surface of the infrared light emission device (or an emergent surface of the LED lamp) and a measurement ending point may be positioned on a plane where one side of the display screen (facing the user) of an electronic device mounted with the distance sensor is located. In other words, after the electronic device is fabricated, the overlapping region M is required to be positioned outside the plane where one side of the display screen (facing the user) of the electronic device is located.

In the embodiment, a wavelength of the light emitted by each infrared light emission device 22 is within a range from 940 nm to 1,000 nm, an emission direction is within the set ranges, the set ranges n is usually a cone and the luminous flux density thereof is related to emission power of each infrared light emission device 22. Therefore, the number of the infrared light emission devices 22 is at least two in the embodiment, so that luminous flux densities in regions n may be reduced to half of the original luminous flux density, and thus, a luminous flux density of a region in the display screen 10 is also be halved. Along with an increase in the number of the infrared light emission devices 22, the luminous flux density corresponding to each infrared light emission devices 22 may be reduced rapidly, thereby preventing a pixel in the display screen from being excited to emit light and avoiding a light spot. However, along with the increase in the number of the infrared light emission devices 22, the reduction of the luminous flux density may influence accuracy of result data output by the light sensor 23. Therefore, in combination with the luminous flux density and the accuracy of the result data, the number of the infrared light emission devices 22 may be three in the embodiment.

Of course, those skilled in the art may also regulate the number of the infrared light emission devices according to wavelengths of the light emitted by different infrared light emission devices 22 or power, and under the condition that the display screen does not display any light spot, each solution falls within the scope of protection of the present application.

For ensuring light emission efficiency of the infrared light emission device, the at least two infrared light emission devices 22 may be powered by a same power supply in the embodiment. For example, at least two LED lamps 22 are connected in series, and the same power supply provides the same current for each LED lamp 22, so that it is ensured that each LED lamp has the same emission power and the same luminance. For example, at least two LED lamps 22 are connected in parallel, and the same power supply may provide the same voltage for each LED lamp 22, so that it is ensured that each LED lamp has approximate emission power and approximate luminance; and after one LED lamp 22 is damaged, the distance sensor may be continued to be used, so that service life is favorably prolonged.

In the embodiment, an arrangement position of each infrared light emission device 22 needs to ensure that the respective set ranges have the overlapping region M and a height of the overlapping region M is required to exceed a thickness of the display screen 10 of the electronic device where the distance sensor is located, namely the overlapping region and the infrared light emission devices are positioned on two sides of the display screen 10 respectively, to achieve an effect of no light spot on the display screen.

In combination with powering by a same power supply and the overlapping region M, in the embodiment, an arrangement manner for the at least two infrared light emission devices 22 may be arrangement in rows, arrangement in columns or arrangement according to a set pattern. For example, when the number of the LED lamps 22 is larger than three, the set pattern may be a triangle, a rectangle and the like. Those skilled in the art may select a proper arrangement manner according to a specific scenario and a corresponding solution falls within the scope of protection of the present application.

Figure 2:
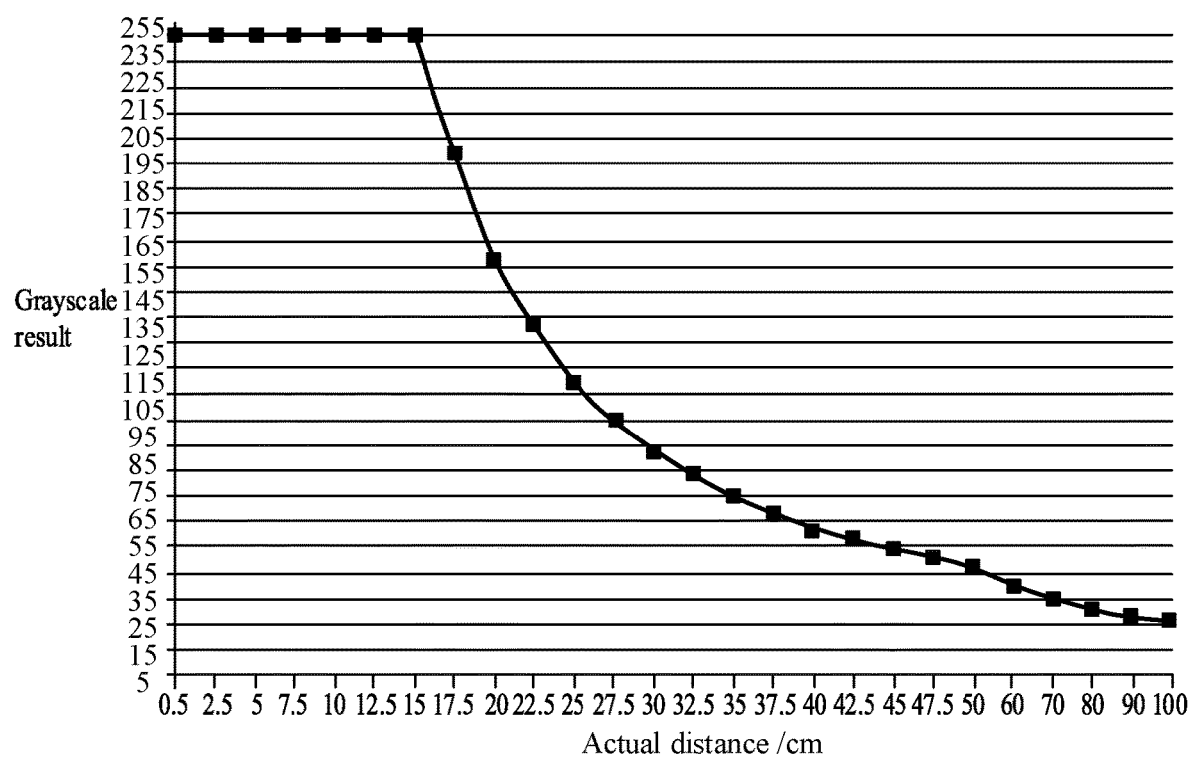
FIG. 2 is a relationship curve between result data and a distance according to some embodiments of the present disclosure.

In the embodiment, the light sensor is configured to, after being turned on, perform photoelectric conversion to obtain a photovoltage and calculate a distance between an object and the distance sensor according to the photovoltage and a preset relationship curve between a photovoltage and a distance. Or, the light sensor is configured to, after being turned on, perform photoelectric conversion to obtain the photovoltage, calculate a grayscale result (i.e., a digital data grayscale result 'count', hereinafter referred to as result data, obtained by performing analog-to-digital conversion on an analog data photovoltage through an Analog Front-End (AFE) Analog-to-Digital Converter (ADC)) according to the photovoltage and a preset table of correspondences between photovoltages and grayscale results, and output the result data. A processor of the electronic device where the distance sensor is located performs data calculation. For example, the processor may perform calculation based on the relationship curve between the result data and the distances in FIG. 2. In FIG. 2, the abscissa represents an actual distance, and the ordinate represents the result data. The actual distance between the display screen and the detected object is finally obtained. Those skilled in the art may select a proper light sensor for implementation according to a specific scenario, and under the condition that the abovementioned function may be realized, a corresponding solution falls within the scope of protection of the present application.

Considering that a distance between the infrared light emission device 22 and the light sensor 23 is relatively short, the light wall structure 24 made from the light absorption material is arranged in the embodiment. Still referring to FIG. 1, the preformed groove 241 is formed in the light wall structure 24, and the preformed groove 241 is configured to arrange the light sensor 23, namely a size of the preformed groove 241 is slightly larger than a size of the light sensor 23. Since the light wall structure 241 is made from the light absorption material, the light emitted by the infrared light emission device 22 may not be directly incident to the light sensor 23. Meanwhile, ambient light at a bottom (below in FIG. 1) of the light sensor 23 may also not be incident to the light sensor. Therefore, it is ensured that the light sensor 23 may only sense reflected light generated after the light emitted by the infrared light emission device 22 passes through the object, and detection accuracy is improved.

In some embodiments, the distance sensor may further include a controller, and the controller is configured to: turn on the light sensor 23 and the at least two infrared light emission devices 22 according to an external control signal, namely, to enable the at least two infrared light emission devices 22 to emit the light and the light sensor 23 to sense the reflected light for distance detection; or, turn off the light sensor 23 and the at least two infrared light emission devices 22 according to the external control signal.

Accordingly, in the embodiment of the present disclosure, the at least two infrared light emission devices are arranged in the distance sensor, each of the at least two infrared light emission devices emits the light to the set range, the set ranges corresponding to respective infrared light emission devices have the overlapping region beyond the preset height, the luminous flux density in the overlapping region exceeds the set density threshold value and the luminous flux density outside the overlapping region is less than the set density threshold value, so that a luminous flux density of the display screen region may be less than the set density threshold value. If the set density threshold value is a critical value corresponding to a luminous flux density capable of exciting the pixel to emit light, the display screen may not be excited to display any light spot in the embodiments, which is favorable for protecting the display screen and improving a user experience. Moreover, in the embodiment, the light sensor is arranged in the preformed groove of the light wall structure, so that the light sensor may be prevented from being contaminated by the light emitted by the infrared light emission device, which is favorable for ensuring accuracy of a detection result of the light sensor.

Figure 3:
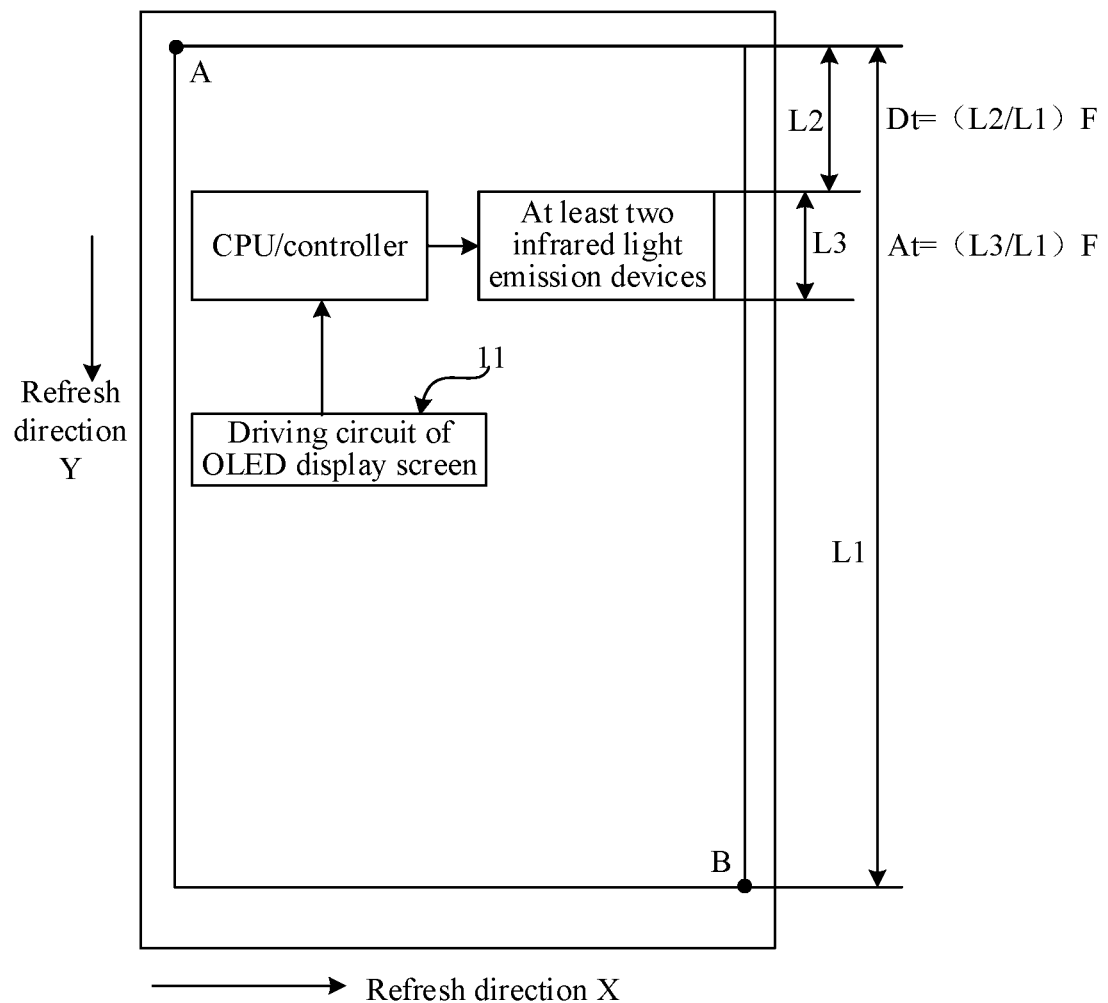
FIG. 3 is a block diagram of an electronic device according to some embodiments of the present disclosure.

The embodiments of the present disclosure also provide a display device and an electronic device. Considering that the display device is arranged in the electronic device, for simple description, the electronic device is directly described in the subsequent embodiments. FIG. 3 is a block diagram of an electronic device according to some embodiments of the present disclosure. The electronic device may be a smart phone, a tablet computer and the like. Referring to FIG. 3, the electronic device includes a display device. The display device may include an OLED display screen and a distance sensor shown in FIG. 1 to FIG. 2, wherein the distance sensor is arranged on a substrate of the OLED display screen and on a side far away from a light output direction of the OLED display screen.

In some embodiments, still referring to FIG. 3, the OLED display screen 10 includes a driving circuit 11, for example, a gate driving circuit. The driving circuit 11 is configured to, after outputting a driving signal to a specified row of pixels, send a synchronization signal to a controller of the distance sensor 20, the synchronization signal being taken as an external control signal of the controller. The specified row may include a first row of the OLED display screen 10 or a row corresponding to a region of the arrangement position of the distance sensor 10 in the display device. Under this circumstance, the distance sensor 20 may form an electrical connection or a communication connection with the OLED display screen 10 to ensure that the distance sensor acquires the synchronization signal.

In some embodiments, the display device further includes a data driving circuit (not shown in the figure). The data driving circuit is configured to insert a set number of set image frames according to a time sequence for the OLED display screen 10 to display. The distance sensor 20 is configured to perform distance detection during displaying of a specified row of pixels when the OLED display screen 10 displays the set image frames. For example, a few black blank frames may be inserted every second, and under this circumstance, each pixel in the OLED display screen 10 may not be displayed (equivalently, black is displayed). Under the circumstance that the OLED display screen 10 displays black, distance detection may be performed according to the distance sensor 20, thereby reducing a probability of formation of a light spot.

Figure 4:
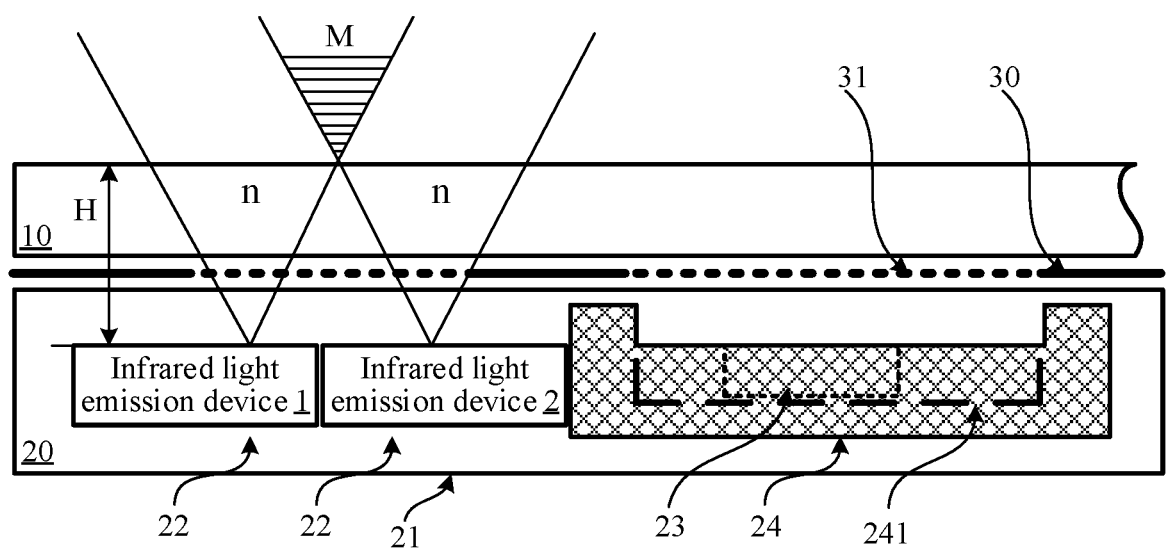
FIG. 4 is a structure diagram of an electronic device in a thickness direction according to some embodiments of the present disclosure.

In some embodiments, referring to FIG. 4, a protective layer 30 is arranged between the OLED display screen 10 and the distance sensor 20, the protective layer 30 is provided with hole(s) 31 at positions corresponding to the distance sensor 20, and the hole(s) 31 are configured to transmit light emitted by and light received by the distance sensor 20. In the embodiment, with the formation of the hole(s) 31, light tightness between the OLED display screen 10 and the distance sensor 20 may be improved, and influence of stray light on a light sensor may be reduced.

Figure 5:
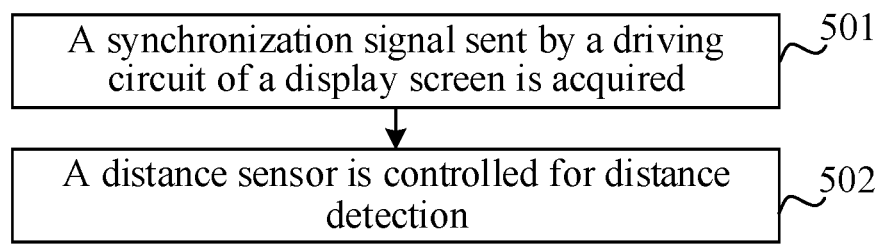
FIG. 5 is a flowchart showing a distance detection method according to some embodiments of the present disclosure.

FIG. 5 is a flowchart showing a distance detection method according to some embodiments of the present disclosure. In combination with the electronic device provided in each abovementioned embodiment, referring to FIG. 5, a working process includes the following operations 501 and 502.

In operation 501, a processor in the electronic device may acquire a synchronization signal sent by a driving circuit of a display screen.

Still referring to FIG. 3, for example, a pixel in a left upper corner of the OLED display screen 10 is a first pixel and a display sequence is from top to bottom and from left to right. When the display screen 10 displays a frame of image and if a pixel in a right lower corner, i.e., a last pixel, is displayed, the driving circuit may generate a frame resetting signal, hereinafter referred to as the synchronization signal, to represent that the frame of image has been completely displayed and a next frame may be displayed. In the embodiment, the processor may establish an electrical connection or a communication connection with the driving circuit and may acquire the synchronization signal through the electrical connection or the communication connection.

It is to be noted that, when a controller is arranged in a distance sensor 20, the controller may replace the processor and the controller establishes an electrical connection or a communication connection with the driving circuit and may acquire the synchronization signal through the electrical connection or the communication connection. In such a manner, an effect of controlling the distance sensor for distance detection may also be achieved. A corresponding solution falls within the scope of protection of the present application.

In operation 402, the processor in the electronic device may control a distance sensor for distance detection.

Figure 6:
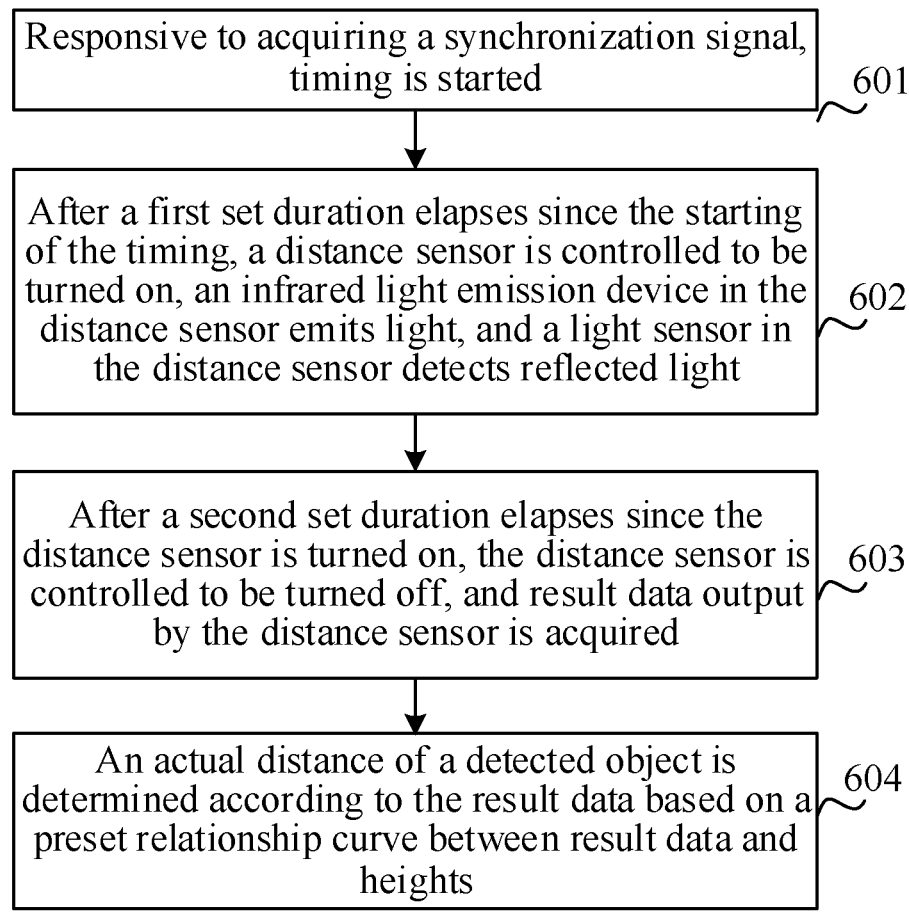
FIG. 6 is a flowchart showing a distance detection method according to some embodiments of the present disclosure.

In the embodiment, the processor, after receiving the synchronization signal, may control the distance sensor for distance detection. Referring to FIG. 6, a distance detection process may include that: the processor may start timing responsive to acquiring the synchronization signal (corresponding to operation 601).

In the embodiment, a first set duration and a second set duration may be preset in the electronic device.

Still referring to FIG. 3, the first set duration Dt is acquired through the following formula:

$$Dt=(L2/L1)/F,$$

where L2 represents a distance between the infrared light emission device in the distance sensor and a top edge of the OLED display screen, L1 represents a length from a top edge to a bottom edge of the OLED display screen, F represents a refresh rate of the OLED display screen, and 1/F is refresh time required by each frame of image.

Still referring to FIG. 3, the second set duration At is acquired through the following formula:

$$At=(L3/L1)/F,$$

where L3 represents a width of the distance sensor in a corresponding direction from the top edge to the bottom edge of the OLED display screen, L1 represents a length from the top edge to the bottom edge of the OLED display screen, and F represents the refresh rate of the OLED display screen.

In a timing process, the processor judges whether a first set duration elapses since the starting of the timing, and after the first set duration elapses since the starting of the timing, the processor may control the distance sensor to be turned on. An infrared light emission device in the distance sensor that is turned on emits light, and a light sensor in the distance sensor detects reflected light (corresponding to operation 602 in FIG. 6).

Then, the processor further judges whether a second set duration elapses since the distance sensor is turned on, and after the second set duration elapses since the distance sensor is turned on, the processor may control the distance sensor to be turned off. The infrared light emission device in the distance sensor that is turned off is turned off, the light sensor in the distance sensor outputs last result data, and the processor may acquire the result data (corresponding to operation 603 in FIG. 6). A process that the light sensor acquires the result data may refer to the contents in the embodiment about the distance sensor.

Finally, the processor may determine an actual distance of a detected object according to the result data based on a relationship curve between result data and distances in FIG. 2 (corresponding to operation 604 in FIG. 6).

Therefore, the processor may determine whether to turn off the OLED display screen or not based on the actual distance and a preset distance threshold value. For example, the distance threshold value is 3 cm; if the actual distance is shorter than 3 cm, it is determined that the distance with the detected object is too short, and the OLED display screen is turned off (namely the screen is turned off); and if the actual distance exceeds 3 cm, it is determined that the distance with the detected object is too long, and the OLED display screen is turned on (namely the screen is turned on).

Figure 7:
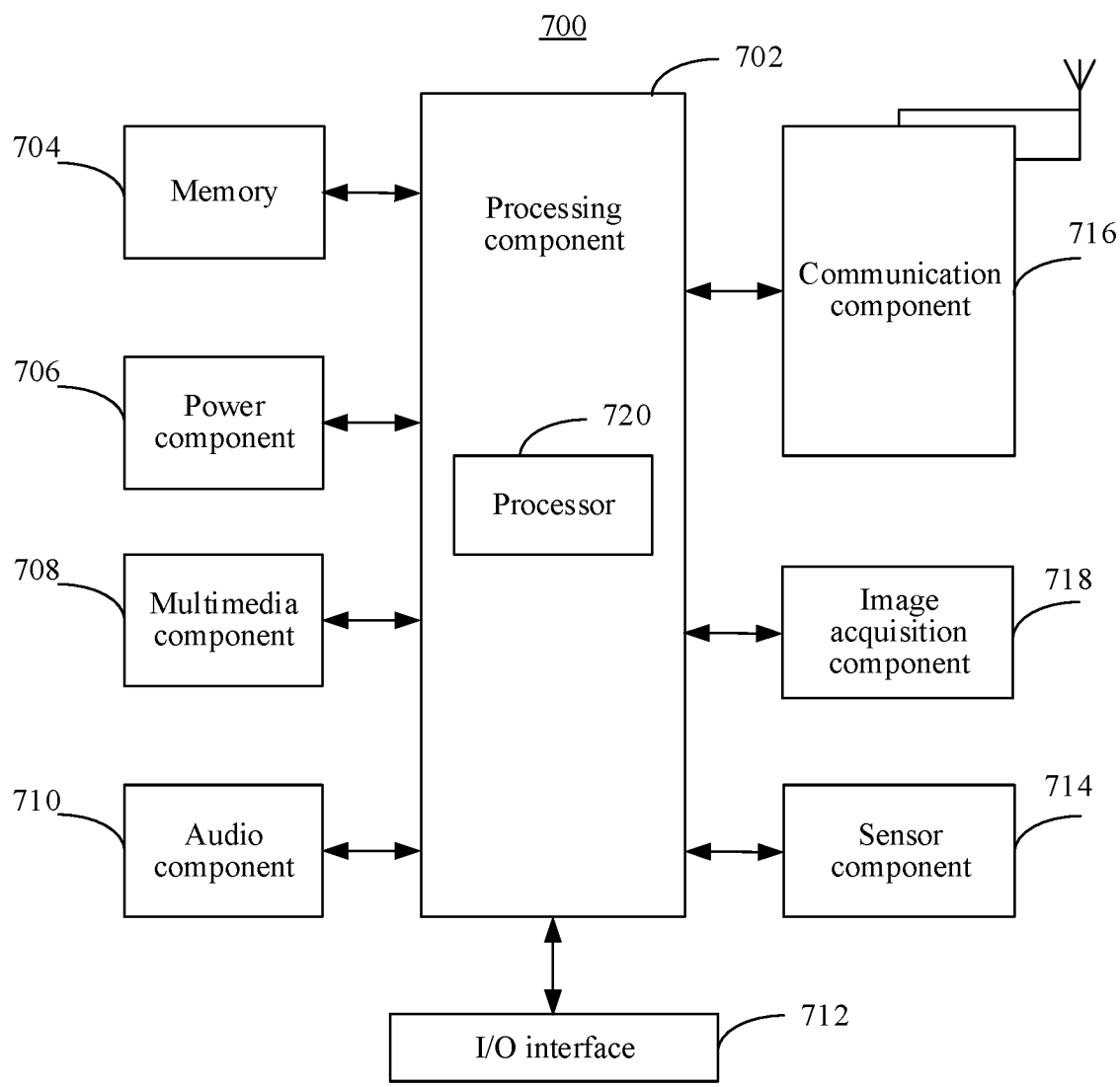
FIG. 7 is a block diagram of an electronic device according to some embodiments of the present disclosure.

FIG. 7 is a block diagram of an electronic device according to some embodiments of the present disclosure. For example, the electronic device 700 may be a smart phone, a computer, a digital broadcast terminal, a tablet, a medical device, exercise equipment, a personal digital assistant and the like.

Referring to FIG. 7, the electronic device 700 may include one or more of the following components: a processing component 702, a memory 704, a power component 706, a multimedia component 708, an audio component 710, an Input/Output (I/O) interface 712, a sensor component 714, a communication component 716 and an image acquisition component 718.

The processing component 702 typically controls overall operations of the electronic device 700, such as the operations associated with display, telephone calls, data communications, camera operations, and recording operations. The processing component 702 may include one or more processors 720 to execute instructions. Moreover, the processing component 702 may include one or more portions which facilitate interaction between the processing component 702 and the other components. For instance, the processing component 702 may include a multimedia portion to facilitate interaction between the multimedia component 708 and the processing component 702. During interaction, the processor 720 may read an executable instruction from the memory 704 to implement the operations of the method shown in FIG. 5 to FIG. 6.

The memory 704 is configured to store various types of data to support the operation of the electronic device 700. Examples of such data include instructions for any application programs or methods operated on the electronic device 700, contact data, phonebook data, messages, pictures, video, etc. The memory 704 may be implemented by any type of volatile or non-volatile memory devices, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the electronic device 700. The power component 706 may include a power management system, one or more power supplies, and other components associated with generation, management and distribution of power for the electronic device 700.

The multimedia component 708 includes a screen providing an output interface between the electronic device 700 and a target object. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the target object. The TP includes one or more touch sensors to sense touches, swipes and gestures on the TP. The touch sensors may not only sense a boundary of a touch or swipe action but also detect a duration and pressure associated with the touch or swipe action.

The audio component 710 is configured to output and/or input an audio signal. For example, the audio component 710 includes a Microphone (MIC), and the MIC is configured to receive an external audio signal when the electronic device 700 is in the operation mode, such as a call mode, a recording mode and a voice recognition mode. The received audio signal may further be stored in the memory 704 or sent through the communication component 716. In some embodiments, the audio component 710 further includes a speaker configured to output the audio signal.

The I/O interface 712 provides an interface between the processing component 702 and a peripheral interface portion, and the peripheral interface portion may be a keyboard, a click wheel, a button and the like.

The sensor component 714 includes one or more sensors configured to provide status assessment in various aspects for the electronic device 700. For instance, the sensor component 714 may detect an on/off status of the electronic device 700 and relative positioning of components, such as a display screen and small keyboard of the electronic device 700, and the sensor component 714 may further detect a change in a position of the electronic device 700 or a component, presence or absence of contact between the target object and the electronic device 700, orientation or acceleration/deceleration of the electronic device 700 and a change in temperature of the electronic device 700. In some embodiments, the sensor component 714 includes a distance sensor shown in FIG. 1 to FIG. 2, and related contents may refer to the contents in each abovementioned embodiment.

The communication component 716 is configured to facilitate wired or wireless communication between the electronic device 700 and another device. The electronic device 700 may access a communication-standard-based wireless network, such as a Wireless Fidelity (Wi-Fi) network, a $2^{nd}$-Generation (2G), $3^{rd}$-Generation (3G), $4^{th}$-Generation (4G), or $5^{th}$-Generation (5G) network or a combination thereof. In some embodiments of the present disclosure, the communication component 716 receives a broadcast signal or broadcast associated information from an external broadcast management system through a broadcast channel. In some embodiments of the present disclosure, the communication component 716 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the electronic device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components.

In some embodiments of the present disclosure, there is also provided a non-transitory readable storage medium including an instruction, such as the memory 704 including an instruction, and the instruction may be executed by the processor 720 of the electronic device 700. For example, the non-transitory readable storage medium may be a ROM, a Random-Access Memory (RAM), a Compact Disc Read-Only Memory (CD-ROM), a magnetic tape, a floppy disc, an optical data storage device and the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A distance sensor, comprising: a shell; and at least two infrared light emission devices, a light sensor and a light wall structure, which are arranged within a space enclosed by the shell,
   wherein each of the at least two infrared light emission devices emits light to a set range, and the set ranges corresponding to respective infrared light emission devices have an overlapping region beyond a preset height, wherein a luminous flux density in the overlapping region exceeds a set density threshold value, and a luminous flux density outside the overlapping region is less than the set density threshold value, wherein the set density threshold value is a critical value corresponding to a luminous flux density of the light emitted by the infrared light emission device that excites a pixel to emit light;
   the light sensor is arranged in a preformed groove in the light wall structure; and
   the light wall structure is made from a light absorption material and configured to prevent incidence of ambient light to the light sensor and prevent the light emitted by the at least two infrared light emission devices from directly entering the light sensor without being reflected.

2. The distance sensor of claim 1, further comprising a controller, wherein the controller is configured to turn on or turn off the light sensor and the at least two infrared light emission devices according to an external control signal.

3. The distance sensor of claim 1, wherein an arrangement manner for the at least two infrared light emission devices comprises one of: arrangement in rows, arrangement in columns, or arrangement according to a set pattern.

4. The distance sensor of claim 1, wherein the at least two infrared light emission devices are powered by a same power supply.

5. The distance sensor of claim 1, wherein a wavelength of the light emitted by the at least two infrared light emission devices is within a range from 940 nm to 1,000 nm.

6. The distance sensor of claim 1, wherein the light sensor is configured to, after being turned on, perform photoelectric conversion to obtain a photovoltage and calculate a distance between an object and the distance sensor according to the photovoltage and a preset relationship curve between photovoltages and distances.

7. The distance sensor of claim 1, wherein the light sensor is configured to, after being turned on, perform photoelectric conversion to obtain a photovoltage, calculate a grayscale result corresponding to the photovoltage according to the photovoltage and a preset table of correspondences between photovoltages and grayscale results, and output the grayscale result to a processor so that the processor can calculate a distance between an object and the distance sensor based on a relationship curve between the grayscale results and distances.

8. A display device, comprising an Organic Light-Emitting Diode (OLED) display screen and the distance sensor of claim 1, wherein the distance sensor is arranged on a substrate of the OLED display screen and on a side far away from a light output direction of the OLED display screen.

9. The display device of claim 8, wherein the OLED display screen comprises a driving circuit of the display screen, wherein the driving circuit is configured to, after outputting a driving signal to a specified row of pixels, send a synchronization signal to a controller of the distance sensor, the synchronization signal being taken as an external control signal of the controller.

10. The display device of claim 8, wherein the preset height is more than or equal to a thickness of the OLED display screen.

11. The display device of claim 8, wherein a protective layer is arranged between the OLED display screen and the distance sensor, the protective layer is provided with one or more holes at positions corresponding to the distance sensor, and the holes are configured to transmit light emitted by and light received by the distance sensor.

12. An electronic device, comprising the display device of claim 8.

13. The electronic device of claim 12, further comprising:
a processor; and
memory configured to store an instruction executable by the processor,
wherein the processor is configured to execute the executable instruction in the memory to perform operations of:
acquiring a synchronization signal sent by a driving circuit of a display screen; and
controlling a distance sensor for distance detection,
wherein controlling the distance sensor for distance detection comprises:
responsive to the acquiring the synchronization signal, starting timing;
after a first set duration elapses since the starting of the timing, controlling the distance sensor to be turned on, emitting light by an infrared light emission device in the distance sensor, and detecting reflected light by a light sensor in the distance sensor;
after a second set duration elapses since the distance sensor is turned on, controlling the distance sensor to be turned off, and acquiring result data output by the distance sensor; and
determining an actual distance of a detected object according to the result data based on a preset relationship curve between result data and distances.

14. A mobile phone, comprising the distance sensor of claim 1, wherein each of the at least two infrared light emission devices is prevented from exciting the display screen to display a light spot.

15. A distance detection method, comprising:
acquiring a synchronization signal sent by a driving circuit of a display screen; and
controlling a distance sensor for distance detection,
wherein controlling the distance sensor for distance detection comprises:
responsive to the acquiring the synchronization signal, starting timing;
after a first set duration elapses since the starting of the timing, controlling the distance sensor to be turned on, emitting light by an infrared light emission device in the distance sensor, and detecting reflected light by a light sensor in the distance sensor;
after a second set duration elapses since the distance sensor is turned on, controlling the distance sensor to be turned off, and acquiring result data output by the distance sensor; and
determining an actual distance of a detected object according to the result data based on a preset relationship curve between result data and distances.

16. The distance detection method of claim 15, wherein the first set duration Dt is acquired through the following formula:

$$Dt=(L2/L1)/F,$$

where L2 represents a distance between the infrared light emission device in the distance sensor and a top edge of the OLED display screen, L1 represents a length from the top edge to a bottom edge of the OLED display screen, and F represents a refresh rate of the OLED display screen.

17. The distance detection method of claim 15, wherein the second set duration At is acquired through the following formula:

$$At=(L3/L1)/F,$$

where L3 represents a width of the distance sensor in a direction from a top edge to a bottom edge of the OLED display screen, L1 represents a length from the top edge to the bottom edge of the OLED display screen, and F represents a refresh rate of the OLED display screen.

18. A non-transitory computer-readable storage medium having stored thereon computer-executable instructions that, when executed by a processor, cause the processor to implement the method of claim 15.

* * * * *